United States Patent
Heath et al.

(10) Patent No.: US 11,449,819 B2
(45) Date of Patent: Sep. 20, 2022

(54) BLOCKCHAIN-BASED AUTHENTICATION AND AUTHORIZATION

(71) Applicant: eBay Inc., San Jose, CA (US)

(72) Inventors: Constanza Maria Heath, Cannon Beach, OR (US); Ethan Benjamin Rubinson, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 516 days.

(21) Appl. No.: 16/457,248

(22) Filed: Jun. 28, 2019

(65) Prior Publication Data

US 2020/0313897 A1 Oct. 1, 2020

Related U.S. Application Data

(60) Provisional application No. 62/825,710, filed on Mar. 28, 2019.

(51) Int. Cl.
*G06Q 10/08* (2012.01)
*H04L 9/06* (2006.01)
(Continued)

(52) U.S. Cl.
CPC ..... *G06Q 10/0832* (2013.01); *G06F 16/1824* (2019.01); *G06F 16/2379* (2019.01);
(Continued)

(58) Field of Classification Search
CPC .......... G06Q 10/0832; G06Q 10/0833; G06Q 10/08345; G06Q 10/0835; G06Q 10/08355; G06Q 20/382; G06Q 20/3825; G06Q 20/4014; G06Q 30/0283; G06Q 30/08; G06Q 50/28; G06Q 2220/00;
(Continued)

(56) References Cited

U.S. PATENT DOCUMENTS

| 5,831,860 A | 11/1998 | Foladare et al. |
| 7,130,771 B2 | 10/2006 | Aghassipour |

(Continued)

FOREIGN PATENT DOCUMENTS

| CN | 202979284 U | 6/2013 |
| CN | 107730279 A | 2/2018 |

(Continued)

OTHER PUBLICATIONS

CryptoTec AG Blockchain for the Automotive Industry, Retrieved from the Internet URL : <https://test.cryptotec.com//wp-content/uploads/2018/01/Blockchain_for_Automotive_CryptoTec_EN.pdf>, Jan. 1, 2018, 5 pages.

(Continued)

*Primary Examiner* — Mohammad W Reza
(74) *Attorney, Agent, or Firm* — FIG. 1 Patents

(57) ABSTRACT

The disclosed technologies include receiving a request from a second computing device to verify ownership of a blockchain address. A challenge content is generated and sent to the requestor. A signature is received comprising a hash of the challenge content generated using a private key. A public key corresponding to the private key is obtained, and the signature is validated using the public key. In response to validating the signature, a characteristic is associated with a user associated with the blockchain address.

20 Claims, 12 Drawing Sheets

(51) Int. Cl.
| | |
|---|---|
| G06K 19/07 | (2006.01) |
| G06F 16/182 | (2019.01) |
| G06Q 20/38 | (2012.01) |
| G06Q 50/28 | (2012.01) |
| G06K 7/14 | (2006.01) |
| H04L 9/32 | (2006.01) |
| G06F 16/23 | (2019.01) |
| G06F 16/955 | (2019.01) |
| G06Q 20/40 | (2012.01) |
| G06Q 30/08 | (2012.01) |
| H04L 9/08 | (2006.01) |
| G06Q 30/02 | (2012.01) |
| H04L 9/00 | (2022.01) |

(52) U.S. Cl.
CPC ......... *G06F 16/955* (2019.01); *G06K 7/1408* (2013.01); *G06K 19/0717* (2013.01); *G06Q 10/0833* (2013.01); *G06Q 10/0835* (2013.01); *G06Q 10/08345* (2013.01); *G06Q 10/08355* (2013.01); *G06Q 20/382* (2013.01); *G06Q 20/3825* (2013.01); *G06Q 20/4014* (2013.01); *G06Q 30/0283* (2013.01); *G06Q 30/08* (2013.01); *G06Q 50/28* (2013.01); *H04L 9/0637* (2013.01); *H04L 9/0643* (2013.01); *H04L 9/0869* (2013.01); *H04L 9/3242* (2013.01); *H04L 9/3263* (2013.01); *H04L 9/50* (2022.05)

(58) Field of Classification Search
CPC ............. G06Q 20/065; G06Q 20/3827; G06Q 20/407; G06Q 20/405; G06Q 10/083; G06F 16/1824; G06F 16/2379; G06F 16/955; G06F 16/29; G06K 7/1408; G06K 19/0717; H04L 9/0637; H04L 9/0643; H04L 9/0869; H04L 9/3242; H04L 9/3263; H04L 2209/38; H04L 9/3239; H04L 67/12; H04L 67/18; H04W 4/40; H04W 12/47; H04W 12/63; H04W 4/027; H04W 4/12; H04W 4/14; H04W 4/80; H04W 4/02; H04W 4/024
See application file for complete search history.

(56) References Cited

U.S. PATENT DOCUMENTS

| | | | |
|---|---|---|---|
| 7,624,024 | B2 | 11/2009 | Levis et al. |
| 7,647,231 | B2 | 1/2010 | Kuebert et al. |
| 8,412,489 | B2 | 4/2013 | Kadaba |
| 9,436,923 | B1 | 9/2016 | Sriram et al. |
| 9,760,854 | B1 | 9/2017 | Chowdhary |
| 9,767,426 | B2 | 9/2017 | Siegel et al. |
| 9,830,571 | B2 | 11/2017 | Betancourt |
| 9,849,364 | B2 | 12/2017 | Tran et al. |
| 9,857,188 | B1 | 1/2018 | O'hare et al. |
| 10,102,526 | B1* | 10/2018 | Madisetti ............. G06Q 20/367 |
| 10,643,171 | B1 | 5/2020 | Zhang |
| 10,721,060 | B1* | 7/2020 | Kaizer .................. H04L 9/3239 |
| 2002/0165729 | A1 | 11/2002 | Kuebert et al. |
| 2003/0163378 | A1 | 8/2003 | Podgurny et al. |
| 2003/0173405 | A1 | 9/2003 | David et al. |
| 2004/0254893 | A1 | 12/2004 | Tsuei et al. |
| 2005/0052284 | A1 | 3/2005 | Schmidtberg et al. |
| 2005/0259658 | A1 | 11/2005 | Logan et al. |
| 2006/0282277 | A1 | 12/2006 | Ng |
| 2007/0210916 | A1 | 9/2007 | Ogushi et al. |
| 2008/0052044 | A1 | 2/2008 | Shoenfeld |
| 2008/0111674 | A1 | 5/2008 | Quine |
| 2009/0303052 | A1 | 12/2009 | Aklepi et al. |
| 2010/0164686 | A1 | 7/2010 | Johnson |
| 2010/0299640 | A1 | 11/2010 | Titus |
| 2012/0023555 | A1 | 1/2012 | Putterman |
| 2012/0173448 | A1 | 7/2012 | Rademaker |
| 2012/0235791 | A1 | 9/2012 | Donlan et al. |
| 2014/0035721 | A1 | 2/2014 | Heppe et al. |
| 2014/0180959 | A1 | 6/2014 | Gillen et al. |
| 2014/0244537 | A1 | 8/2014 | Jani et al. |
| 2014/0266712 | A1 | 9/2014 | Bobo et al. |
| 2014/0372334 | A1 | 12/2014 | Wrentmore |
| 2014/0379603 | A1 | 12/2014 | Bodenhamer et al. |
| 2015/0046361 | A1 | 2/2015 | Williams et al. |
| 2015/0382085 | A1 | 12/2015 | Lawrie-fussey et al. |
| 2016/0063433 | A1 | 3/2016 | Glasgow et al. |
| 2016/0098730 | A1 | 4/2016 | Feeney |
| 2016/0260059 | A1 | 9/2016 | Benjamin et al. |
| 2016/0350712 | A1 | 12/2016 | Wesemann et al. |
| 2017/0109696 | A1 | 4/2017 | Serjeantson et al. |
| 2017/0121021 | A1 | 5/2017 | Bonazzoli et al. |
| 2017/0180128 | A1 | 6/2017 | Lu |
| 2017/0180134 | A1* | 6/2017 | King ..................... H04L 9/3268 |
| 2017/0221052 | A1 | 8/2017 | Sheng et al. |
| 2017/0229000 | A1 | 8/2017 | Law |
| 2017/0243213 | A1 | 8/2017 | Castinado et al. |
| 2017/0257358 | A1 | 9/2017 | Ebrahimi et al. |
| 2017/0329980 | A1 | 11/2017 | Hu et al. |
| 2017/0344988 | A1 | 11/2017 | Cusden et al. |
| 2018/0024554 | A1 | 1/2018 | Brady et al. |
| 2018/0096175 | A1 | 4/2018 | Schmeling et al. |
| 2018/0097635 | A1 | 4/2018 | Moses |
| 2018/0167198 | A1 | 6/2018 | Muller et al. |
| 2018/0174093 | A1 | 6/2018 | Perez |
| 2018/0174097 | A1 | 6/2018 | Liu et al. |
| 2018/0220278 | A1 | 8/2018 | Tal et al. |
| 2018/0232693 | A1 | 8/2018 | Gillen et al. |
| 2018/0253691 | A1 | 9/2018 | High et al. |
| 2018/0255131 | A1 | 9/2018 | StÖcker et al. |
| 2018/0264347 | A1 | 9/2018 | Tran et al. |
| 2018/0276611 | A1 | 9/2018 | Dromerhauser et al. |
| 2018/0349896 | A1 | 12/2018 | Arora et al. |
| 2019/0012637 | A1 | 1/2019 | Gillen |
| 2019/0014116 | A1 | 1/2019 | Khi et al. |
| 2019/0019144 | A1 | 1/2019 | Gillen |
| 2019/0034863 | A1 | 1/2019 | Winkle et al. |
| 2019/0036932 | A1 | 1/2019 | Bathen et al. |
| 2019/0102735 | A1 | 4/2019 | Barton et al. |
| 2019/0114714 | A1 | 4/2019 | Jones et al. |
| 2019/0164241 | A1 | 5/2019 | BÄssler et al. |
| 2019/0197531 | A1 | 6/2019 | Peenikal et al. |
| 2019/0205898 | A1 | 7/2019 | Greco et al. |
| 2019/0266550 | A1 | 8/2019 | Santosh et al. |
| 2019/0293443 | A1 | 9/2019 | Kelly et al. |
| 2019/0333130 | A1 | 10/2019 | Jha et al. |
| 2020/0005240 | A1 | 1/2020 | Ko et al. |
| 2020/0042933 | A1 | 2/2020 | Jurich, Jr. et al. |
| 2020/0052880 | A1* | 2/2020 | Bathen ................. H04L 63/102 |
| 2020/0142739 | A1 | 5/2020 | Chan et al. |
| 2020/0211000 | A1 | 7/2020 | Narasimhan |
| 2020/0311665 | A1 | 10/2020 | Gray et al. |
| 2020/0311666 | A1 | 10/2020 | Gray et al. |
| 2020/0311670 | A1 | 10/2020 | Sankaran et al. |
| 2020/0311675 | A1 | 10/2020 | Sankaran et al. |
| 2020/0311676 | A1 | 10/2020 | Smith, Jr. |
| 2021/0272049 | A1 | 9/2021 | Gillen et al. |

FOREIGN PATENT DOCUMENTS

| | | |
|---|---|---|
| EP | 3296974 A1 | 3/2018 |
| EP | 3640872 A1 | 4/2020 |
| WO | 2013/002748 A1 | 1/2013 |
| WO | 2015/021482 A1 | 2/2015 |
| WO | 2017/127564 A1 | 7/2017 |
| WO | 2018/099920 A1 | 6/2018 |
| WO | 2020/096713 A1 | 5/2020 |
| WO | 2020/197639 A1 | 10/2020 |
| WO | 2020/197640 A1 | 10/2020 |
| WO | 2020/197642 A1 | 10/2020 |
| WO | 2020/197683 A1 | 10/2020 |

(56) References Cited

OTHER PUBLICATIONS

International Search Report received for PCT Application No. PCT/US2019/053815, dated Nov. 22, 2019, 4 pages.
International Search Report received for PCT Application No. PCT/US2020/016450, dated Apr. 20, 2020, 4 pages.
International Search Report received for PCT Application No. PCT/US2020/016453, dated Apr. 21, 2020, 3 pages.
International Search Report received for PCT Application No. PCT/US2020/019976, dated Apr. 23, 2020, 3 pages.
International Written Opinion received for PCT Application No. PCT/US2019/053815, dated Nov. 22, 2019, 6 pages.
International Written Opinion received for PCT Patent Application No. PCT/US2020/019976 , dated Apr. 23, 2020, 5 pages.
Written Opinion received for PCT Patent Application No. PCT/US2020/016450, dated Apr. 20, 2020, 6 pages.
Written Opinion received for PCT Patent Application No. PCT/US2020/016453, dated Apr. 21, 2020, 7 pages.
Non-Final Office Action received for U.S. Appl. No. 16/384,362, dated Nov. 5, 2020, 18 pages.
Boudguiga et al., "Towards Better Availability and Accountability for IoT Updates by means of a Blockchain", 2017 IEEE European Symposium on Security and Privacy Workshops (EuroS&PW), Apr. 2017, pp. 50-58.
Hanhaa, "Make An Example of Hanhaa's Parcelive—How Else Can It Be Used?", Retrieved from the Internet URL : <https://hanhaa.com/make-an-example-of-hanhaas-parcelive-how-else-can-it-be-used/?, Jun. 17, 2019, 5 pages.
Zhang et al., "FHIRChain: Applying Blockchain to Securely and Scalably Share Clinical Data", Retrieved from the internet: <https://www.sciencedirect.com/science/article/pii/S2001037018300370>, Jul. 29, 2018, pp. 267-278.
International Search Report received for PCT Application No. PCT/US2020/016680, dated Apr. 24, 2020, 4 Pages.
Written Opinion received for PCT Patent Application No. PCT/US2020/016680, dated Apr. 24, 2020, 6 Pages.
Final Office Action Received for U.S. Appl. No. 14/471,420, dated Jun. 18, 2021, 16 Pages.
Final Office Action received for U.S. Appl. No. 16/455,284, dated Sep. 7, 2021, 20 pages.
Final Office Action received for U.S. Appl. No. 16/457,056, dated Sep. 8, 2021, 30 pages.
Final Office Action received for U.S. Appl. No. 16/458,645, dated Sep. 28, 2021, 35 pages.
International Preliminary Report on Patentability received for PCT Patent Application No. PCT/US2020/016450, dated Oct. 7, 2021, 8 pages.
International Preliminary Report on Patentability received for PCT Application No. PCT/US2020/016453, dated Oct. 7, 2021, 9 pages.
International Preliminary Report on Patentability received for PCT Patent Application No. PCT/US2020/016680, dated Oct. 7, 2021, 8 pages.
International Preliminary Report on Patentability received for PCT Application No. PCT/US2020/019976, dated Oct. 7, 2021, 7 pages.
Advisory Action received for U.S. Appl. No. 14/471,420, dated May 31, 2018, 3 pages.
Applicant Initiated Interview Summary received for U.S. Appl. No. 14/471,420, dated Apr. 6, 2020, 3 pages.
Applicant Initiated Interview Summary received for U.S. Appl. No. 14/471,420, dated Nov. 13, 2017, 3 pages.
Final Office Action received for U.S. Appl. No. 14/471,420, dated Aug. 6, 2019, 15 pages.
Final Office Action received for U.S. Appl. No. 14/471,420, dated Mar. 15, 2018, 18 pages.
Non Final Office Action received for U.S. Appl. No. 14/471,420, dated Feb. 7, 2020, 20 pages.
Non-Final Office Action received for U.S. Appl. No. 14/471,420, dated Sep. 11, 2017, 15 pages.
Non-Final Office Action received for U.S. Appl. No. 14/471,420, dated Feb. 26, 2019, 18 pages.
Response to Advisory Action filed on Aug. 15, 2018, for U.S. Appl. No. 14/471,420, dated May 31, 2018, 13 pages.
Response to Final Office Action filed on May 21, 2018, for U.S. Appl. No. 14/471,420, dated Mar. 15, 2018, 15 pages.
Response to Final Office Action filed on Sep. 30, 2019, for U.S. Appl. No. 14/471,420, dated Aug. 6, 2019, 11 pages.
Response to Non-Final Office Action filed on Jan. 11, 2018, for U.S. Appl. No. 14/471,420, dated Sep. 11, 2017, 14 pages.
Response to Non-Final Office Action filed on Jun. 3, 2019, for U.S. Appl. No. 14/471,420, dated Feb. 26, 2019, 20 pages.
Response to Non-Final Office Action filed on May 7, 2020, for U.S. Appl. No. 14/471,420, dated Feb. 7, 2020, 11 pages.
Non-Final Office Action received for U.S. Appl. No. 14/471,420, dated Jan. 28, 2021, 17 Pages.
Non Final Office Action Received for U.S. Appl. No. 16/455,284, dated Mar. 31, 2021, 19 Pages.
Non Final Office Action Received for U.S. Appl. No. 16/457,056, dated Apr. 21, 2021, 28 pages.
Non-Final Office Action received for U.S. Appl. No. 16/458,645, dated Apr. 5, 2021, 31 Pages.
Aitawy et al., "Lelantos: A Blockchain-based Anonymous Physical Delivery System", 2017 15th Annual Conference on Privacy, Security and Trust, (Year: 2017), 2017, 12 pages.
Boudguiga et al., "Towards Better Availability and Accountability for IoT Updates by Means of a Blockchain", 2017 IEEE European Symposium on Security and Privacy Workshops (EUROS&PW), Apr. 1, 2017, 5 pages.
Hasan et al., "Blockchain-Based Proof of Delivery of Physical Assets With Single and Multiple Transporters", Aug. 21, 2018, IEEE vol. 6, 2018, pp. 46781-46793, 13 Pages.
Final Office Action received for U.S. Appl. No. 14/471,420, dated Jun. 17, 2020, 15 pages.
Non Final Office Action Received for U.S. Appl. No. 14/471,420, dated Jan. 7, 2022, 18 Pages.
Non Final Office Action Received for U.S. Appl. No. 16/454,996, dated Nov. 30, 2021, 20 pages.
Non-final Office Action received for U.S. Appl. No. 16/455,170, dated Feb. 1, 2022, 19 Pages.
Non Final Office Action Received for U.S. Appl. No. 16/457,056, dated Dec. 14, 2021, 34 Pages.
Wikipedia,"Spinning pinwheel", Retrieved from Internet URL: https://en.wikipedia.org/wiki/Spinning_pinwheel, Accessed on Dec. 21, 2021, 4 Pages.
Wikipedia,"Windows wait cursor", Retrieved from Internet URL: https://en.wikipedia.org/wiki/Windows_wait_cursor, Accessed on Dec. 21, 2021, 1 Page.
U.S. Appl. No. 14/471,420 , "Advisory Action received for U.S. Appl. No. 14/471,420 dated Aug. 1, 2022", Aug. 1, 2022, 3 Pages.
U.S. Appl. No. 14/471,420, "Final Office Action", U.S. Appl. No. 14/471,420, dated May 20, 2022, 17 pages.
U.S. Appl. No. 16/454,996, "Non-Final Office Action", U.S. Appl. No. 16/454,996, dated Jul. 21, 2022, 29 pages.
U.S. Appl. No. 16/455,170, "Final Office Action", U.S. Appl. No. 16/455,170, filed Jul. 13, 2022, 19 pages.
16/455,284, "Supplemental Notice of Allowability", U.S. Appl. No. 16/455,284, filed Jun. 3, 2022, 2 pages.
U.S. Appl. No. 16/458,645 , "Notice of Allowance received for U.S. Appl. No. 16/458,645, dated Jun. 21, 2022", Jun. 21, 2022, 10 pages.

* cited by examiner

BLOCKCHAIN-BASED AUTHENTICATION AND AUTHORIZATION

PRIORITY APPLICATION

This application claims the benefit of and priority to U.S. Provisional Application No. 62/825,710, filed Mar. 28, 2019, the entire contents of which are incorporated herein by reference.

BACKGROUND

Various interactions conducted over the Internet typically involve two or more parties that interact through respective computing devices. The parties typically do not conduct transactions via face-to-face contact. In such circumstances, it is important to establish a level of trust between the parties to ensure that there are no issues that may hinder transactional efficiencies. One way to establish trust is by use of a central authority such as a marketplace that provides verifications and guarantees. Reputation ratings, which may also be maintained by a central authority, can provide another source of trust. Parties with good reputations based on past interactions may be viewed as more trustworthy than parties with low ratings or parties with no history.

There are also applications and services where the identity of a user must be verified (i.e., authenticated) in order to access and use the applications and services. Authentication techniques may include providing a password, a biometric scan, or other data from the user's computing device to the central authority, which then compares the data against a record maintained by the central authority. Authentication may be used to identify a user, but may not be sufficient to authorize access to all activities associated with a given application or service. The user may need to meet a set of criteria (i.e., be authorized) in order to perform some activities. For example, unpaid users may be able to access a website after logging in, but some features of the website may be available only to paid users.

Authentication and authorization of users with respect to permissions granted by a central authority may be opaque to other users. There may be situations in which the user is reluctant to extend trust to another user based only on assurances provided by a central authority. The data or conclusions provided by the central authority may be incorrect or they may even be biased and unfair (e.g., overly negative or overly positive).

It is with respect to these and other technical considerations that the disclosure made herein is presented.

SUMMARY

In various embodiments, a blockchain address may be used to provide authentication and authorization of users in various online and other interactions. In one embodiment, ownership/control of a blockchain address may be determined using a private key without exposing the private key or making any changes to the blockchain. Control of the private key allows the user or owner/controller of the blockchain address to sign for transactions associated with the blockchain address. An association between the user, or one or more of the user's accounts, and the blockchain address may be recorded on the blockchain and may be used to authenticate the user and build authorization policies around attributes of that blockchain.

Data recorded on a blockchain is decentralized and difficult to modify, which provides security and transparency. Any party able to view the contents of the blockchain can be provided, with a high degree of certainty, with an assurance that identities, cryptocurrency wallet contents, transaction histories, reputational information, and the like have not been modified improperly.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1:
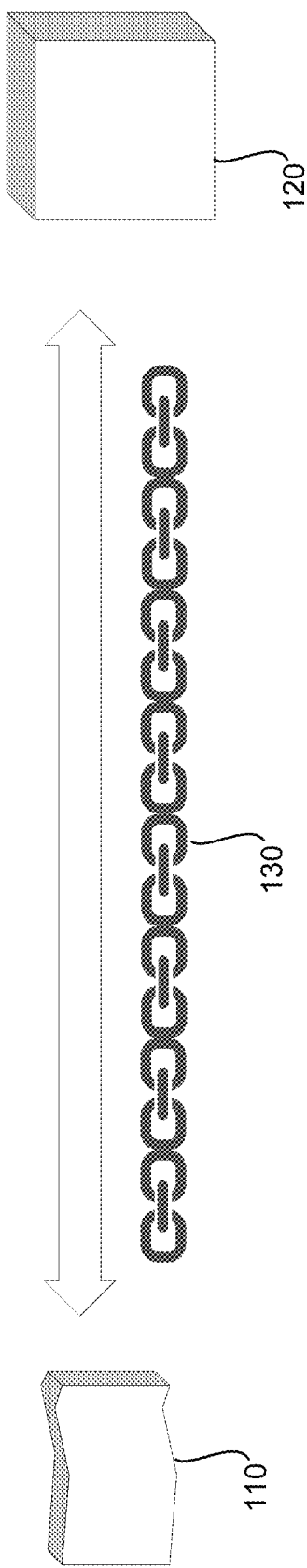
FIG. 1 is a block diagram illustrating one embodiment disclosed herein.

The following Detailed Description presents technologies for using a blockchain address to provide authentication and authorization of users in various online and other interactions. A user may be verified to have ownership/control of a blockchain address based on the user's possession of a private key, without the need to expose the private key or modify the blockchain. Control of the private key allows the user to sign for transactions associated with the blockchain address. An association between the user, or one or more of the user's accounts, and the blockchain address may be recorded on the blockchain and may be used to authenticate the user and build authorization policies around attributes of that blockchain.

The disclosed technologies can enhance the functionality, security, and efficiency of various online and other interactions. As just one example, by improving authentication using data stored in a blockchain, security and access of data in a blockchain may be improved. Similarly, by using attributes stored in the blockchain as part of the authentication, security is assured in a performant way that involves efficient use of storage. The disclosed technologies can enable more efficient and more accurate user identification, which can result in improved performance of computing resources. Technical benefits other than those specifically mentioned herein might also be realized through implementations of the disclosed technologies.

It is to be appreciated that while the technologies disclosed herein are primarily described in the context of blockchains and online transactions, the technologies described herein can be utilized to provide authentication and authorization of users in other contexts, which will be apparent to those of skill in the art.

Referring now to the appended drawings, in which like numerals represent like elements throughout the several FIGURES, aspects of various technologies for using a blockchain address to provide authentication and authorization of users will be described. In the following detailed description, references are made to the accompanying drawings that form a part hereof, and which are shown by way of illustration specific configurations or examples.

A blockchain may be viewed as a public distributed ledger. Complete copies of a blockchain may be stored on various computing devices that are distributed around the world. Because the blockchain is public, anyone can access the complete history of transactions and the public addresses that have completed the transactions. A source of a transaction, such as a holder of cryptocurrency, may prove ownership of the sending address that currently stores the cryptocurrency to be sent. The sender also specifies the address where the cryptocurrency is to be sent. The owner of the source address may prove ownership of the sending address by signing the transaction with the private key that was used to generate the public address. Once this is done, the transaction may be broadcast to the blockchain network. The various computing devices on the blockchain network may confirm that the transactions are valid and add the transaction ("block") to the blockchain.

In one embodiment, authentication may be performed by linking a user identity with a blockchain address and encrypting challenge content with a private key. The challenge content may be arbitrary data such as a string of random characters (e.g., letters, numbers, punctuation marks, and combinations thereof). Encrypting challenge content with the private key may comprise generating a hash based on the challenge content. This may be referred to as signing the challenge content.

The hash may be decoded by the entity that provided the challenge content if the entity has possession of the corresponding public key. Because of the relationship between public and private keys, the ability to effectively decode the hash with the public key provides evidence that the user has possession of the corresponding private key. Depending on how the private key is used (e.g., to access a blockchain address such as a cryptocurrency wallet), various types of information may be inferred about the user. For example, the user's identity or whether or not the user is authorized to perform specified actions may be determined.

Public key cryptography, also known as asymmetric cryptography, uses public and private keys to encrypt and decrypt data. The public and private keys may comprise large numbers that have been paired together but are not identical (thus, "asymmetric"). One key in the pair can be shared with the public and may be referred to as the public key. The other key in the pair is kept secret and may be referred to as the private key. Either of the keys can be used to encrypt a message; the opposite key from the one used to encrypt the message is used for decryption.

Many protocols such as SSH, OpenPGP, S/MIME, and SSL/TLS use asymmetric cryptography for encryption and digital signature functions. Asymmetric cryptography may also be used in various applications, such as web browsers, that are configured to establish a secure connection over an insecure network such as the Internet or need to validate a digital signature.

For asymmetric encryption to deliver confidentiality, integrity, authenticity, and non-repudiability, users and systems need to be certain that a given public key is authentic, that it belongs to the person or entity that claims ownership, and that it has not been tampered with or replaced by a malicious third party. A public key infrastructure (PKI), where trusted certificate authorities certify ownership of key pairs and certificates, may be used to address some of these issues.

RSA (Rivest-Shamir-Adleman) is one example of an asymmetric encryption algorithm. RSA is embedded in the SSL/TLS protocol which is used to provide communications security over a computer network. RSA derives its security from the computational difficulty of factoring large integers that are the product of two large prime numbers. Elliptic Curve Cryptography (ECC) is an alternative to RSA for implementing public-key cryptography. ECC is a public key encryption technique based on elliptic curve theory that can be used to generate cryptographic keys. ECC is based on the algebraic structure of elliptic curves over finite fields, and generates keys through the properties of the elliptic curve equation. ECC can be used for encryption by combining the key agreement with a symmetric encryption scheme. At least some embodiments that implement RSA may adopt National Institute of Standards and Technology (NIST) standards such as FIPS PUB 186-4 Digital Signature Standard (DSS).

Public key cryptography is based on the intractability of certain mathematical problems. For elliptic-curve-based protocols, it is assumed that finding the discrete logarithm of a random elliptic curve element with respect to a publicly known base point is infeasible: this is the "elliptic curve discrete logarithm problem" (ECDLP). The security of elliptic curve cryptography depends on the ability to compute a point multiplication and the inability to compute the multiplicand given the original and product points. The size of the elliptic curve determines the difficulty of the problem. The Elliptic Curve Digital Signature Algorithm (ECDSA) offers a variant of the Digital Signature Algorithm (DSA) which uses elliptic curve cryptography. ECDSA is used in Bitcoin to ensure that funds can only be spent by their rightful owners.

As with elliptic-curve cryptography in general, the bit size of the public key believed to be needed for ECDSA is about twice the size of the security level, in bits. For example, at a security level of 80 bits (meaning an attacker requires a maximum of about 280 operations to find the private key) the size of an ECDSA public key would be 160 bits, whereas the size of a DSA public key is at least 1024 bits. On the other hand, the signature size is the same for both DSA and ECDSA: approximately 4t bits, where t is the security level measured in bits, that is, about 320 bits for a security level of 80 bits.

In the example of Bitcoin, a private key is a secret number that allows Bitcoins to be spent. Every Bitcoin wallet contains one or more private keys, which are saved in the wallet file. The private keys are mathematically related to all Bitcoin addresses generated for the wallet. The Bitcoin address itself is the public key. The private key is the "ticket" that allows someone to spend bitcoins from a given bitcoin address. In Bitcoin, the private key is a 256-bit number, which can be represented one of several ways as a hexadecimal, 256 bits in hexadecimal is 32 bytes, or as 64 characters in the range 0-9 or A-F.

A public key is a number that corresponds to a private key but does not need to be kept secret. A public key can be calculated from a private key, but not vice versa. A public key can be used to determine if a signature is genuine (in other words, produced with the proper key) without requiring the private key to be divulged. In Bitcoin, public keys are either compressed or uncompressed. Compressed public keys are 33 bytes, consisting of a prefix either 0x02 or 0x03, and a 256-bit integer called x. The older uncompressed keys are 65 bytes, consisting of constant prefix (0x04), followed by two 256-bit integers called x and y (2×32 bytes). The prefix of a compressed key allows for the y value to be derived from the x value.

A signature is a number that proves that a signing operation took place. A signature is mathematically generated from a hash of something to be signed, plus a private key. The signature itself is two numbers known as r and s. With the public key, a mathematical algorithm can be used on the signature to determine that it was originally produced from the hash and the private key, without needing to know the private key.

Some wallets allow private keys to be imported without generating any transactions while other wallets or services require that the private key be "swept". When a private key is swept, a transaction is broadcast that sends the balance controlled by the private key to a new address in the wallet.

In an embodiment, an entity that wishes to prove its identity, such as a computing device of a user, may send a request to a server or another device requesting a challenge to prove ownership of a private key such as a private key for a blockchain address. The server may be any a networked computing device such as a transaction server. In response, the server may generate challenge content. In some embodiments, the challenge content may be an arbitrary string of bits such as a random sequence of letters and/or numbers. The server may provide this challenge content to the client. The client, using the private key, may sign the challenge with the private key, generating a hash of the challenge content. The client may send the signature (i.e., the hash of the challenge content) back to the server. The server may obtain the public key or access a previously obtained public key (e.g., one provided in the initial request from the client). Using the public key, the server can authenticate a user associated with the client by decoding the hash and confirming that it generates the original challenge content. This demonstrates that the client is in possession of the private key.

By implementing the described technique, the server does not gain access to the private key but is nevertheless able to infer that the client is in possession of the private key. Any information associated with the public key, such as a blockchain record, may then be associated with the client that provided the signature, and thus with a user identity linked to the client. This technique may be repeated any number of times by any number of different servers or other computing devices. For example, the client may request a challenge on-demand every time that the client wishes to interact with another computing device that is configured to use this authentication technique.

By authenticating a user using the techniques described herein, a user, the user's accounts, or the user's device can be linked to an external global unique identifier (GUID). This external GUID may be used across a variety of online interactions and may be required to access certain websites or various system and network functions. For example, a user's reputation or status on a given website or online marketplace may be linked to the user's GUID. One technique for creating an independent identity such as an external GUID on distributed ledgers is project Indy by Hyperledger.

Indy provides tools, libraries, and reusable components for providing digital identities rooted in blockchains or other distributed ledgers so that they are interoperable across administrative domains, applications, and any other silo. Indy provides accessible provenance for trust transactions. Provenance is the foundation of accountability through recourse. Indy supports user-controlled exchange of verifiable claims about an identifier and includes a revocation model for cases where those claims are no longer true. Verifiable claims are a component of Indy's ability to serve as a platform for exchanging trustworthy claims about identifiers.

Identifiers on Indy are pairwise unique and pseudonymous by default to prevent correlation. Indy uses Decentralized Identifiers (DIDs) as the primary keys on the ledger. DIDs are a type of digital identifier that enable long-term digital identities which do not require centralized registry services. DIDs can be verified using cryptography, enabling a digital "web of trust." DIDs on the ledger point to DID Descriptor Objects (DDOs) which are signed JSON objects that can contain public keys and service endpoints for a given identifier. DIDs are a component of Indy's pairwise identifier architecture. Personal data is never written to the ledger. Rather, private data is exchanged over peer-to-peer encrypted connections between off-ledger agents. The ledger is only used for anchoring rather than publishing encrypted data. Indy also includes built-in support for zero-knowledge proofs (ZKP) to avoid unnecessary disclosure of identity attributes.

In cryptography, a zero-knowledge proof or zero-knowledge protocol is a method by which one party (a prover such as a user) can prove to another party (a verifier such as a server) that the prover is in possession of a value x, without conveying any information apart from the fact that the prover has knowledge of the value x. The essence of zero-knowledge proofs is that it is trivial to prove that one possesses knowledge of certain information by simply revealing it; the challenge is to prove such possession without revealing the information itself (e.g., a private key) or any additional information.

If proving a statement requires that the prover possess some secret information, then the verifier will not be able to prove the statement to anyone else without possessing the secret information. The statement being proved must include the assertion that the prover has such knowledge, but not the knowledge itself. Otherwise, the statement would not be proved in zero-knowledge because it provides the verifier with additional information about the statement by the end of the protocol. A zero-knowledge proof of knowledge is a special case when the statement consists only of the fact that the prover possesses the secret information. Interactive zero-knowledge proofs require interaction between the individual (or computer system) proving its knowledge and the individual (or computer system) validating the proof.

A protocol implementing zero-knowledge proofs of knowledge uses interactive input from the verifier. This interactive input is typically in the form of one or more challenges provided as challenge content such that a response from the prover will convince the verifier if and only if the statement is true (i.e., if the prover does possess the claimed knowledge of value x). If this were not the case, the verifier could record the execution of the protocol and replay it to convince someone else that they possess the secret information. The new party's acceptance is either justified since the replayer does possess the information (which implies that the protocol leaked information, and thus, is not proved in zero-knowledge), or the acceptance is spurious, (i.e., was accepted from someone who does not actually possess the information).

Authorization may be provided to a user based on a characteristic that is identified from a record in a blockchain. Authorization pertains to what a user is allowed to do rather than who the user is (which is authentication). The blockchain may be the same blockchain used to provide the authentication for the user. For example, authorization may be based on the amount of funds in a cryptocurrency wallet (either in cryptocurrency or in fiat currency equivalents). In an embodiment, an authorization may identify that a cryptocurrency wallet associated with a private key has more than a threshold value of currency in the wallet.

An authorization as described herein may be used to limit access to certain content or functionality based on evidenced availability of value such as currency. For example, an online auction for high-value items may only authorize those users that have been verified to have more than a threshold amount of money in their cryptocurrency wallets to be authorized to place bids. This prevents users from bidding on items for which they cannot pay. The threshold value may be based on a current bid price or an estimated selling price of an item.

By verifying control over the private key, the user provides proof of his or her ability to control the use of funds in the cryptocurrency wallet controlled with that private key. This may be implemented using techniques similar to those described above for authentication of the user. In some implementations of cryptocurrency, the amount of funds associated with a wallet or public key may be publicly viewable. Thus, by providing evidence of control over the private key that controls funds available in a publicly viewable cryptocurrency wallet, the user is able to allow other users to determine the amount of funds that the user has access to without conducting a transaction or granting access to the funds in the wallet.

In some embodiments, characteristics other than the amount of funds in a cryptocurrency wallet may be used to grant or deny authorization for access to functions. For example, past purchase history, sales history, and payment history for a user may be recorded in a blockchain. This blockchain may be the same or different than the blockchain that contains cryptocurrency. This information may include the number of purchases, the number of sales, the total amount of money paid, the number of canceled purchases, the number of returns, the number of canceled sales, the number of refunds issued, the number of failed payments, etc. Any or all of this information related to past transactions may be used to develop a reputation for the user.

In one embodiment, the reputation may be based on the underlying numbers and types of transactions. Different techniques or algorithms may be used for processing the underlying data into a reputational score or rating such as, for example, a star rating from 0 to 5 stars. Different types of data may be weighted differently to determine a reputational score. Because the transaction data is stored in a blockchain, this data can be verified independently and is difficult to change or delete. The techniques for creating a rating or reputational score may be integrated into a blockchain such as through use of a smart contract technique. Alternatively, different third parties such as websites, online merchants, etc. may have their own algorithms or processes for converting the transaction history of the user into a reputational score. Depending on the rating or score, a user may receive a "certification" or other indication that the reputational score exceeds a threshold level. Certification may be implemented (or revoked) automatically (e.g., by using a smart contract) once the reputational score exceeds the threshold level.

The reputational score or ranking of a user may be one characteristic that is used to authorize one or more functions or activities. For example, a reputational score above a threshold level (e.g., four or more stars out on a five-star scale) may be required to participate in certain transactions such as bidding on an item or requesting a refund.

The transaction information recorded on the blockchain may be less than the entirety of transaction records for a user. For example, items purchased and amounts paid may be omitted. Thus, the transaction records may include information such as the number of and type of transactions and the success or failure of those transactions. This provides information relevant to identifying the behavior and reputation of the user without revealing private information regarding the details of specific transactions.

In an embodiment, the reputational score for a user may be used to generate a "buying license" that permits the user to buy or bid on certain items from transactional sites or online auctions. A buying license may include a reputational score. The reputational score for a user may increase or decrease based on transaction behavior recorded in the blockchain. If the reputational score decreases below a threshold level, the user may be prohibited from engaging in certain actions such as buying or selling items. Using the reputational, bad actors can be identified and the immutability of records contained in the blockchain will make it difficult for those actors to distance themselves from their past behavior.

In some embodiments, information may be recorded in a blockchain other than transaction records to enable determination of the identity or trustworthiness of a user. For example, buying habits, browser fingerprints, Internet protocol (IP) addresses of devices used, a username, an email address, a phone number, a physical address, and the like may be stored in a blockchain association with a user identity. In some implementations, this information may be stored in a private blockchain so that is not publicly available to a third party. Functionality to analyze the stored information may be integrated into a blockchain. Alternatively, different third parties may implement algorithms or processes for incorporating the information associated with the user into the reputational score.

In some embodiments, an oracle may be used to make assertions based on information in a blockchain address. In some implementations, an oracle may be a server that allows for selected conditions to be checked for. As Bitcoin nodes are not typically configured to measure arbitrary conditions, the blockchain technology used for Bitcoin typically relies on an oracle. An oracle may have a keypair, and may be configured to sign transactions on request when a user-provided expression evaluates to TRUE. Oracles may be used to evaluate a variety of requests; however, the output script form in the blockchain can be the same. The conditions that determine whether the oracle signs a transaction can be arbitrarily complex, but the blockchain need not contain more than a single hash.

The permissions granted to a user based on the authorization techniques described herein may themselves be encoded in the blockchain. In some embodiments, permissions may be used to provide granular levels of trust. For example, a user may be provided permission to view content but not to edit or delete the content. This represents a limited amount of trust: trusting the user with access to the content but not with control over the content.

In some embodiments, permissions recorded in the blockchain may be implemented using scripting logic and smart contracts. In an example, a smart contract may include computer code that causes one or more of the blockchains to implement various actions based on specific triggering criteria. If certain conditions are identified as true, either due to data being recorded in the blockchain or by use of an oracle, then specific permissions may be granted to the user.

FIG. 1 shows one example of a blockchain implementation. As shown in FIG. 1, the blockchain infrastructure may be used to facilitate transactions between participants using, for example, cryptocurrency. In the figure, User 1 110 may be associated with a user account that facilitates blockchain transactions. User 1 110 may also be associated with an account electronic wallet with cryptocurrency that is configured to operate with blockchain transactions. In one embodiment, User 1 110 may engage in a bilateral transaction with User 2 120. For example, the bilateral transaction may involve using a smart contract. The smart contract may specify data which may be transformed into data usable on the blockchain 130.

Figure 2:
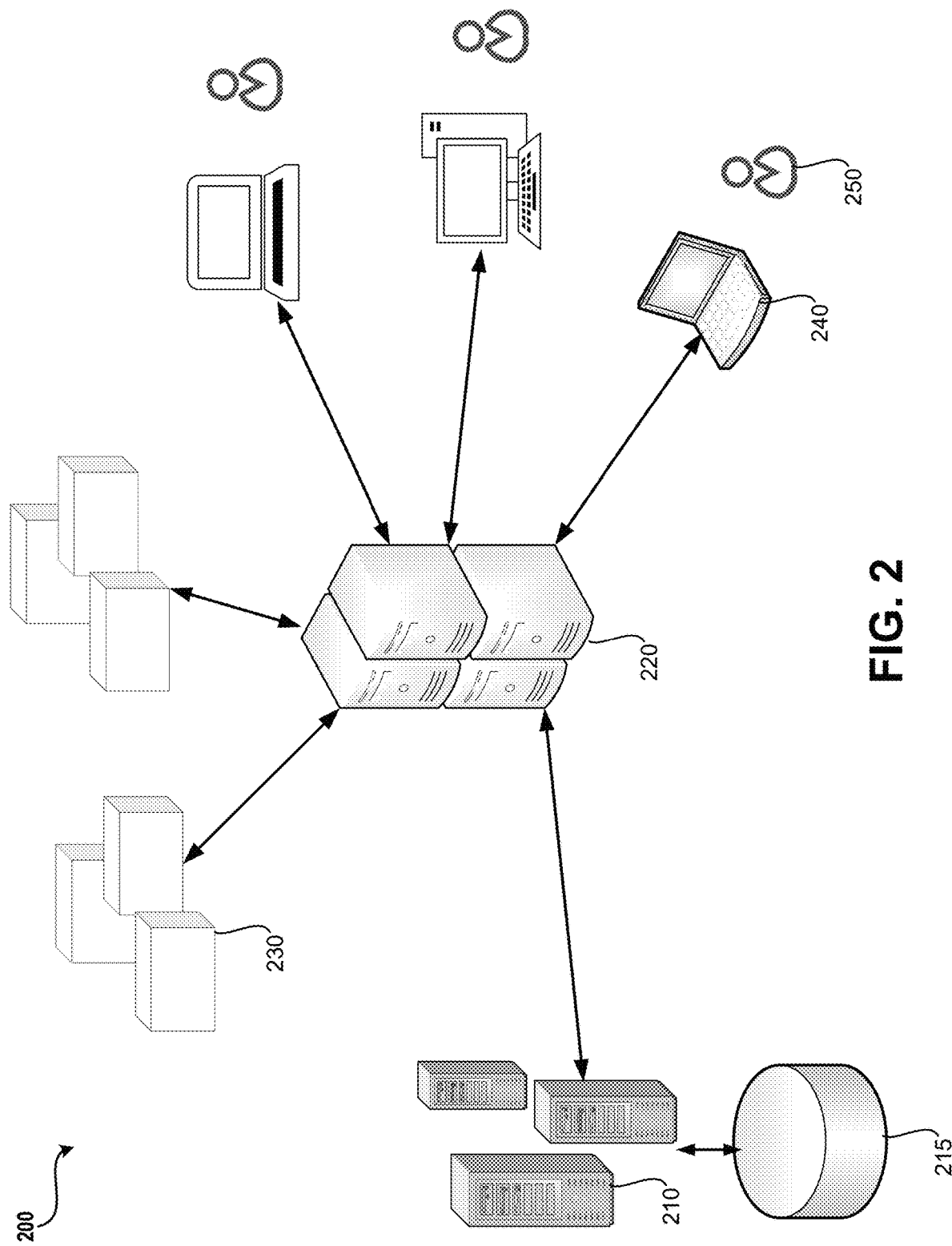
FIG. 2 is a diagram showing aspects of a system according to one embodiment disclosed herein.

FIG. 2 illustrates a block diagram showing an example networked blockchain embodiment. The networked blockchain environment 200 may include servers 210. The servers 210 may comprise one or more servers, which may collectively be referred to as "server." The network environment 200 may further include a database 215, which may be configured to store various information used by the server 210 including client data, financial transaction data, and the like. The network environment 200 may further include communications server 220, which, for example, enables network communication between the server 210, third party servers 230, and client devices 240. The client devices 240 may be any type of computing device that may be used by users 250 to connect with the server 210 over a communications network. Users 250 may be, for example, users who hold accounts with financial institutions. The servers 230 may be operated by any other party that is involved in a transaction. For example, the servers 230 may be configured to implement auction sites or online transactions. Accordingly, the servers 230 may be any type of computing device described herein as may be operated by an auction broker, a financial institution, and the like. The servers and devices represented in FIG. 2 communicate via various network communications hardware and software to facilitate the collection and exchange of data for use in a blockchain infrastructure. In some embodiments, the blockchain infrastructure may include a blockchain platform that supports and maintains blockchains. For example, the ETHEREUM blockchain platform from the ETHEREUM FOUNDATION of Switzerland provides a decentralized, distributed computing platform and operating system that also provides scripting functionality.

Figure 3:
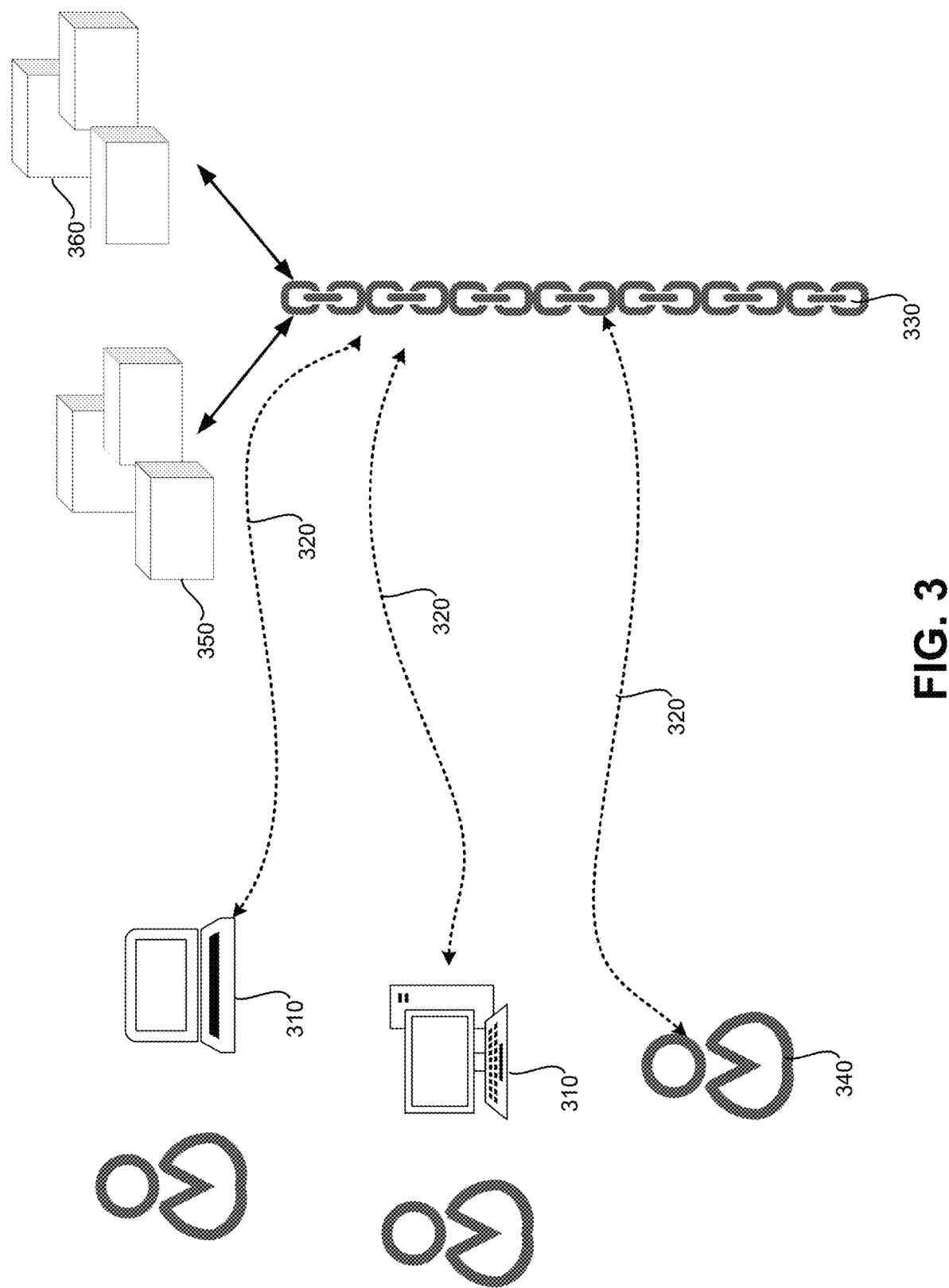
FIG. 3 is a diagram showing aspects of a system according to one embodiment disclosed herein.

FIG. 3 shows a block diagram illustrating one example where computing devices 310 are engaged in blockchain transactions 320 where cryptocurrency transactions are recorded in blockchain 330. In one example, cryptocurrency users may manage addresses by using a digital wallet. Wallets may be configured by users 340 to send or receive cryptocurrency payments and generate addresses. Wallets may be configured to store addresses and corresponding public/private keys on the user's computing device, conducting transactions by transferring cryptocurrency, and manage information pertaining prior transactions.

Figure 4:
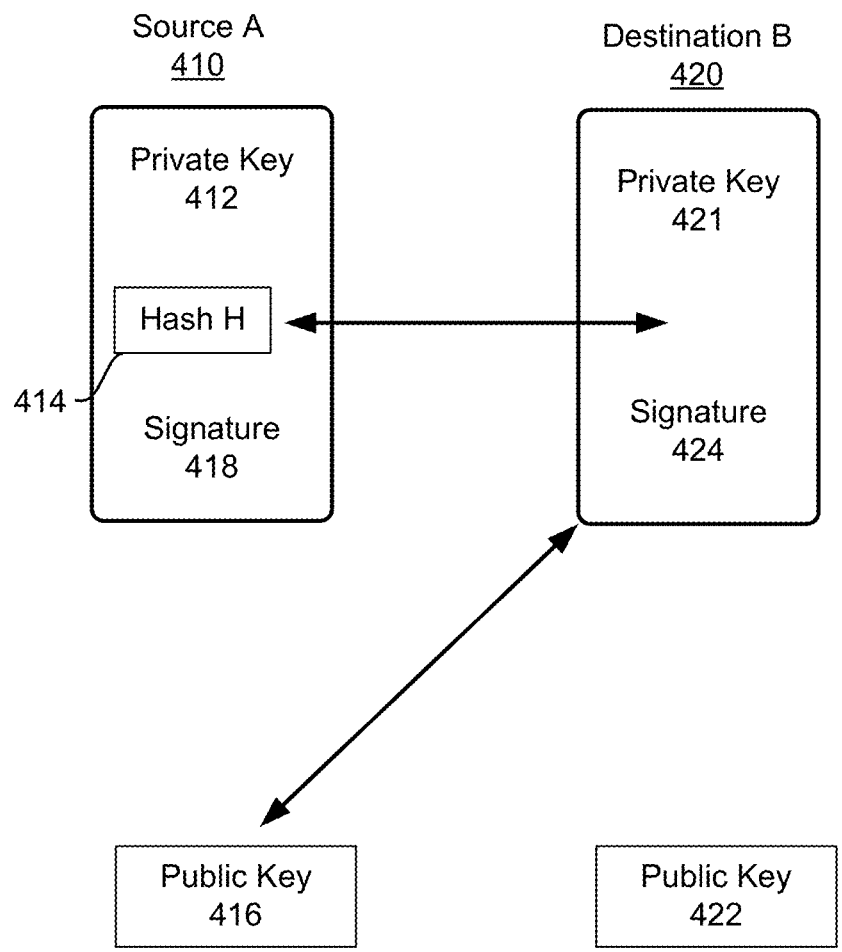
FIG. 4 is a block diagram illustrating one embodiment disclosed herein.

In the example shown in FIG. 4, a device at source address A 410 may transfer a payment to a device at destination address B 420 by digitally signing, using its private key 412, a generated hash H 414 of a prior transaction. The private key 412 may correspond to public key 416 of address A. Additionally, the digital signature 424 of address B can be verified by using B's public key 422 without knowing its private key 421. A blockchain contains all such transactions previously executed, wherein each block contains a hash of the previous block. A transaction is a signed section of data that is distributed to the network and collected into blocks, and may reference prior transactions.

Figure 5:
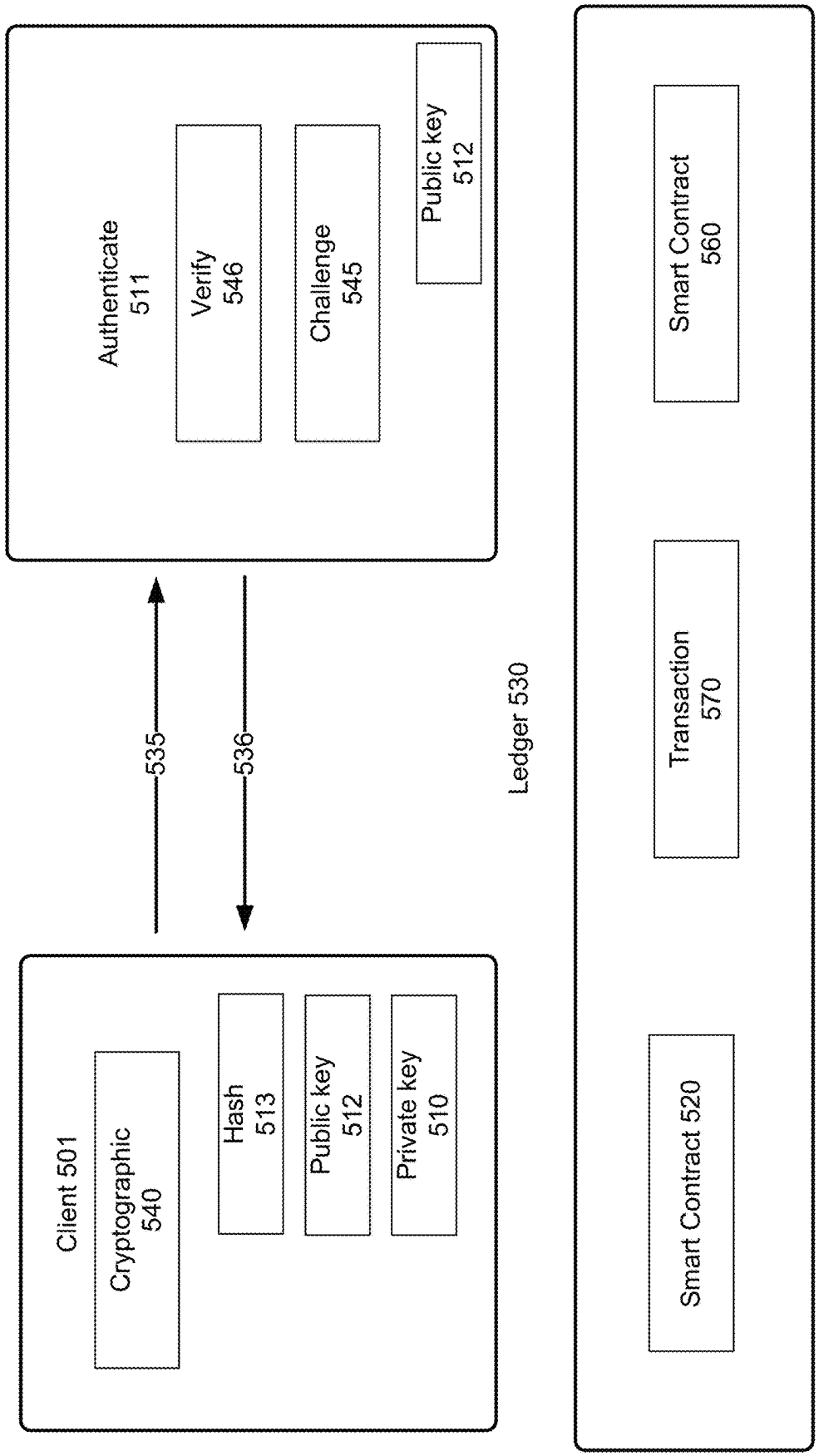
FIG. 5 is a block diagram illustrating one embodiment disclosed herein.

In the example shown in FIG. 5, a private key 510 may be used to control access to a smart contract 520 of a ledger 530. In some embodiments, the ledger 530 may be arranged as a Merkle tree data structure, as a linked list, or as any similar data structure that allows for cryptographic integrity. By possessing the private key 510, client 501 is allowed access to, and/or control of the smart contract 520. In an embodiment, an identifier of the smart contract 520 may be assigned by the ledger 530 and can represent a client identifier such as an address. The client identifier may be a unique value, for example a random value. In some embodiments, the public key 512 of the client 501 can represent the client identifier. In an embodiment, an authentication process 511 comprises at least one authentication response 535 that is sent to support ledger transaction 570 made within ledger 530 from smart contract 520. Only client 501 is in possession of the private key 510, and thus only client 501 has access to, and is in control of, the smart contract 520. In one example, the client 501 can perform an initial authentication request 535 to an authentication function 511. The authentication function 511 can generate a challenge 545 (e.g., a random number), which can be transferred 536 to the client 501 for example, over HTTPS, and/or any other data transfer protocols.

The client 501, using the client identifier and the challenge 545, can produce a hash 513 using a cryptographic function 540. The cryptographic function 540 can include a one-way hashing function (e.g., SHA-1, SHA-2, etc.). In some embodiments, the public key 512 can be used with the challenge response 535 as inputs to the verify function 546. Because the client 501 is in possession of the private key 510, the authentication function 511 can verify the response without having access to the private key 510. Once verified, the authentication function 511 may further generate a ledger transaction 570 that includes a record of the verification via smart contract 560. In some embodiments, the authentication response ledger transaction 570 is proof and/or verification of possession of the private key 510 by the client 501 to the authentication function 511.

Figure 6:
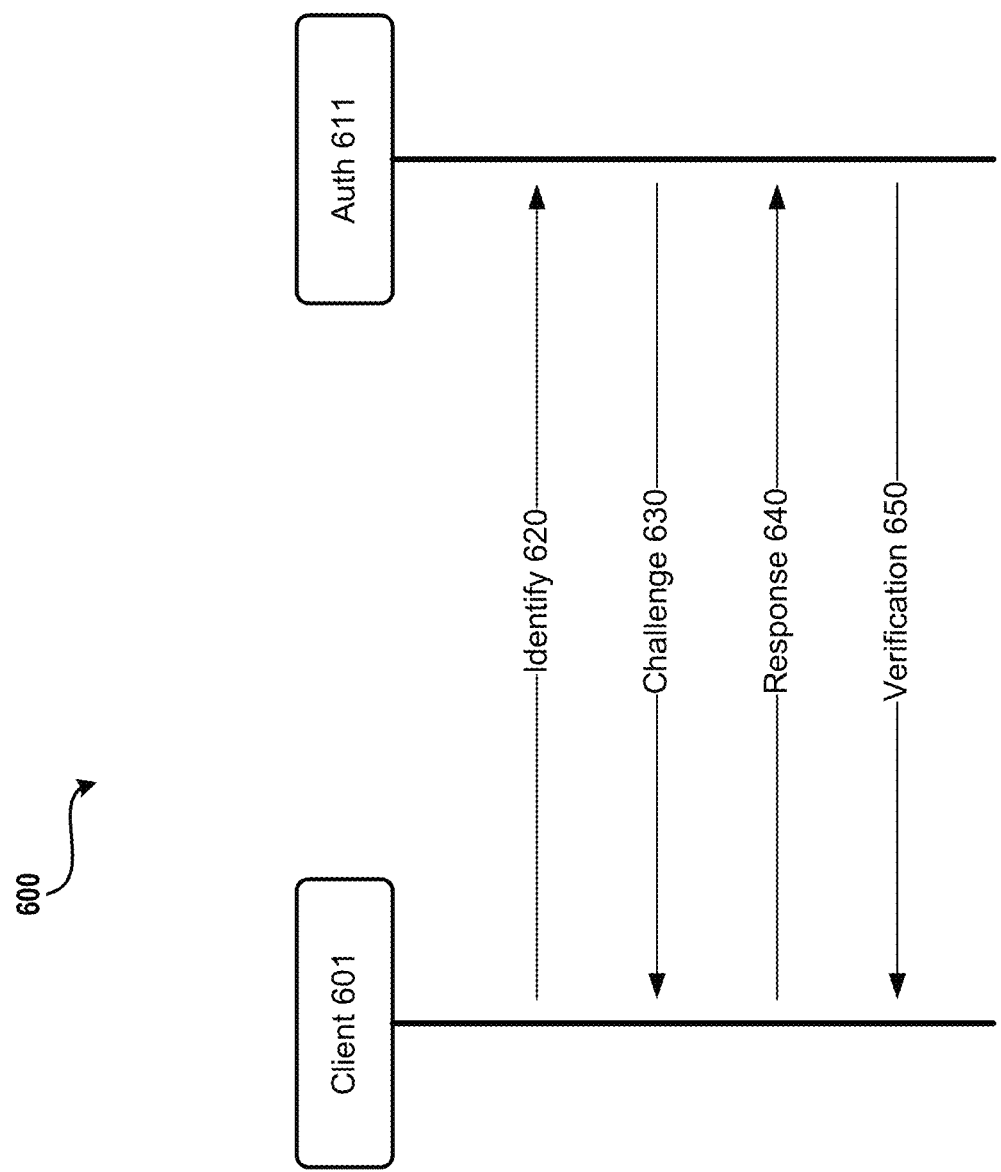
FIG. 6 is a flow diagram showing aspects of an illustrative routine, according to one embodiment disclosed herein.

An example of an authentication process is shown in FIG. 6 as a data flow diagram of a zero-knowledge authentication. Referring to FIG. 6, client 601 sends a identify request 620 to the authentication function 611. The authentication function 611 responds to the client 601 with a challenge 630. By way of example, the challenge 630 can include a random number. Client 601 may perform a hash function or other process with the random number using its private key and sends the generated value 640 back to the authentication function 611. The authentication function 611 verifies the value from the client 501 and responds with a verification result 650 as to whether the challenge-response was verified. In some embodiments, the client 601 generates a digital signature using its private key, and the authentication function 611 validates this digital signature using the public key corresponding to the private key. In another embodiment, a zero-knowledge proof of the private key knowledge can be generated by client 501 and be sent to the authentication function 611.

Figure 7:
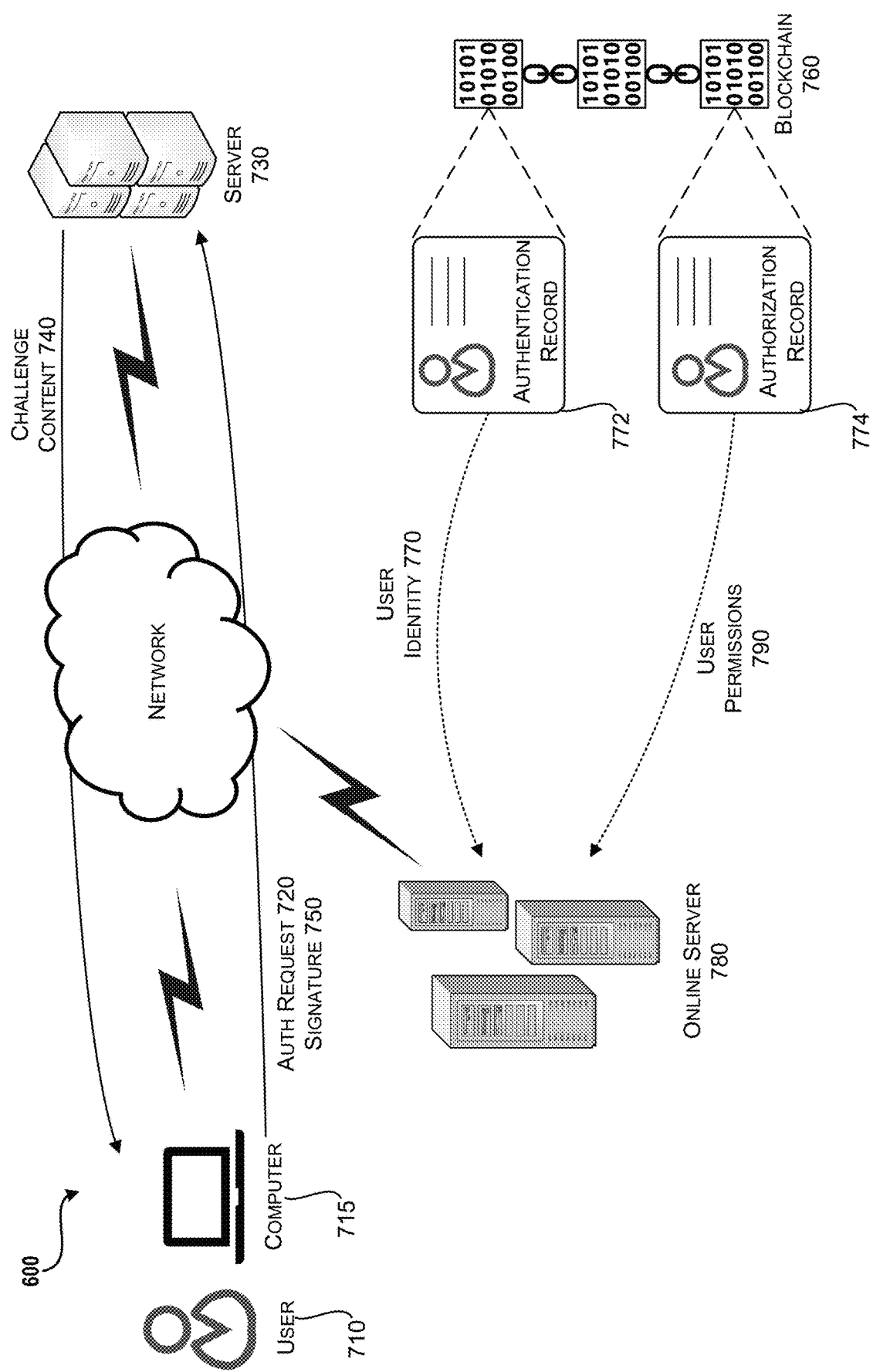
FIG. 7 is a system diagram illustrating one embodiment disclosed herein.

FIG. 7 illustrates aspects of the techniques describe herein for using a blockchain address to provide authentication and authorization of users in various online and other interactions. In an embodiment, a user 710 that wishes to prove its identity, such as a computing device 715 of the user 710, may send a request 720 to a server 730 requesting a challenge to prove ownership of a private key such as a private key for a blockchain address. The server 730 may be any networked computing device such as a transaction server. In response, the server 730 may generate challenge content 740. In some embodiments, the challenge content 740 may be an arbitrary string of bits such as a random sequence of letters and/or numbers. The server 730 may provide this challenge content 740 to the computer 715. The computer 715, using the private key, may sign the challenge content 740 with the private key, generating a hash of the challenge content 740. The computer 715 may send the signature 750 (i.e., the hash of the challenge content) back to the server 730. The server 730 may obtain the public key or access a previously obtained public key (e.g., one provided in the initial request from the user). Using the public key, the server 730 can authenticate the user 710 associated with the computing device 715 by decoding the hash and confirming that it generates the original challenge content. This demonstrates that the user is in possession of the private key.

By implementing the described technique, the server 730 does not gain access to the private key but is nevertheless able to infer that the user is in possession of the private key. Any information associated with the public key, such as a blockchain record 760, may then be associated with the user 710 that provided the signature 750, and thus with a user identity 770 linked to the user 710. This technique may be repeated any number of times by any number of different servers or other computing devices such as online server 780. For example, the client may request a challenge on-demand every time that the client wishes to interact with another computing device that is configured to use this authentication technique.

By authenticating the user 710, the user, the user's accounts, or the user's device can be linked to authentication record 772 and authorization record 774. The authentication record 772 and authorization record 774 may be used across a variety of online interactions and may be required to access certain websites or various system and network functions. For example, a user's reputation or status on a given web site or online marketplace may be linked to the user's authentication record 772 and authorization record 774. For example, the authentication record 772 and authorization record 774 may be used to verify the user identity 770 or user permissions 790.

Figure 8:
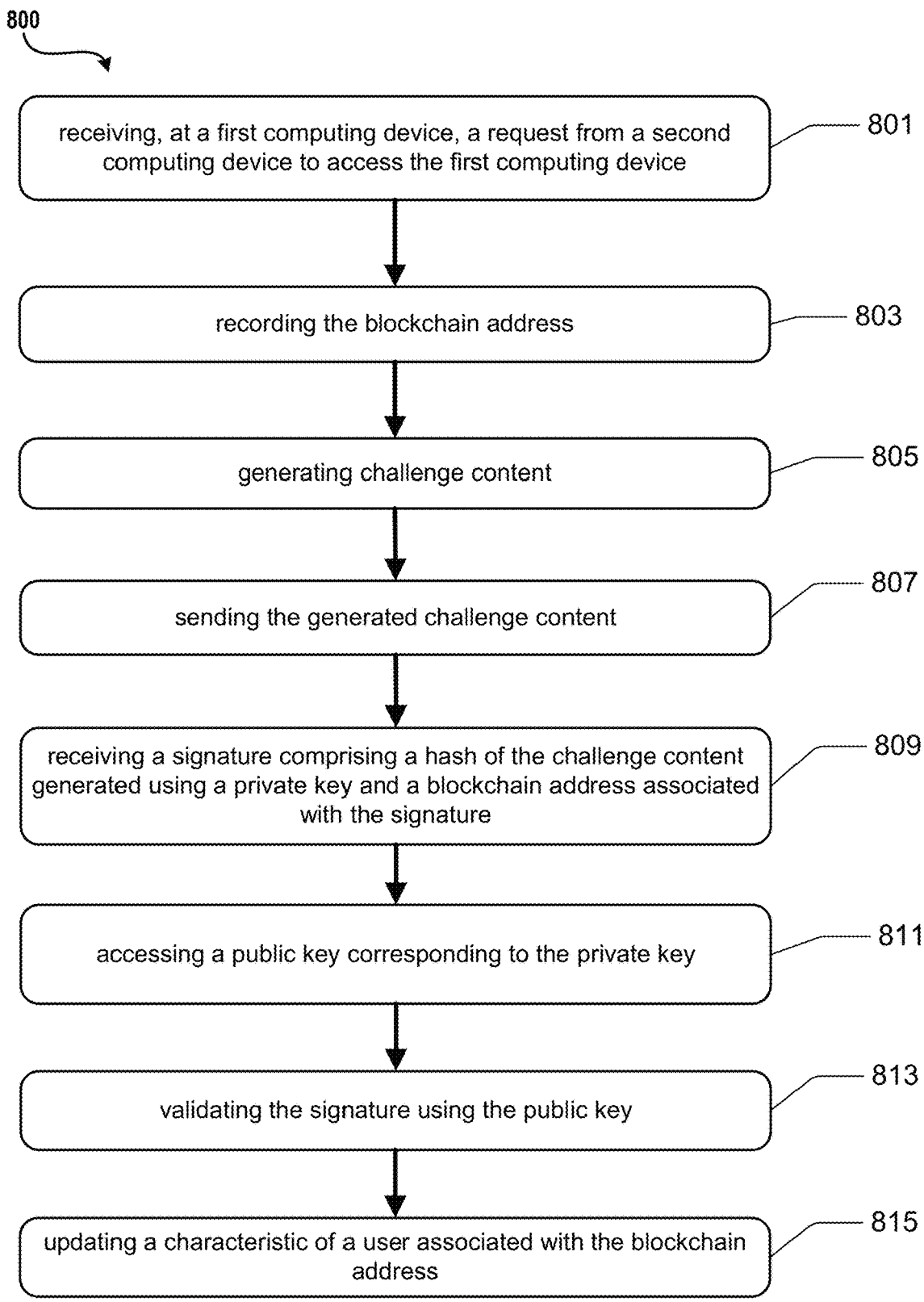
FIG. 8 is a flow diagram showing aspects of an illustrative routine, according to one embodiment disclosed herein.

FIG. 8 is a diagram illustrating aspects of a routine 800 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 800 begins at operation 801, which illustrates receiving, at a first computing device, a request from a second computing device to access the first computing device. In an embodiment, the blockchain address is associated with a cryptocurrency wallet.

The routine 800 then proceeds to operation 803, which illustrates optionally recording, by the first computing device, the blockchain address.

Operation 805 illustrates generating, by the first computing device, challenge content. In an embodiment, the challenge content is a string of randomly generated characters.

Next, operation 807 illustrates sending, by the first computing device to the second computing device, the generated challenge content.

Next, operation 809 illustrates receiving, by the first computing device from the second computing device, a signature comprising a hash of the challenge content generated using a private key and a blockchain address associated with the signature.

Operation 811 illustrates accessing, by the first computing device, a public key corresponding to the private key. In an embodiment, the public key is encoded in the blockchain address.

Operation 813 illustrates validating, by the first computing device, the signature using the public key.

Operation 815 illustrates in response to validating the signature, updating a characteristic of a user associated with the blockchain address. In an embodiment, updating the characteristic comprises determining that a value of funds stored in the cryptocurrency wallet exceeds a threshold value. In some embodiments, updating the characteristic comprises linking the user with a global unique identifier (GUID). In another embodiment, updating the characteristic comprises allowing the user to access one or more websites or one or more functions. Additionally and optionally, the characteristic may be determined based on information encoded in a blockchain associated with the blockchain address. In some embodiments, the information comprises one or more of buying habits, browser fingerprints, Internet protocol (IP) addresses of devices used by the user, a username, an email address, a phone number, and/or a physical address.

In some embodiments, an account associated with the user is authorized to bid on an item on an auction site, based on the validation. In some embodiments, the user's reputation or status on a website or online marketplace is linked to the GUID. Additionally and optionally, the user's reputation or status may be determined using the user's past purchase history, sales history, or payment history that is recorded on a blockchain associated with the blockchain address. The information may be stored in a private blockchain that is not publicly available In some embodiments, updating the characteristic comprises determining a reputation for the user based on past transactions for the user. In an embodiment, the reputation is a reputational score or rating that is based on past purchase history, sales history, and/or payment history for the user. In an embodiment, the characteristic associated with the user is encoded in a blockchain associated with the user.

In an embodiment, the user may be associated with an indication that the reputational score exceeds a threshold level. As used herein, the owner of a blockchain address may also be referred to as a user or controller of the blockchain address.

Figure 9:
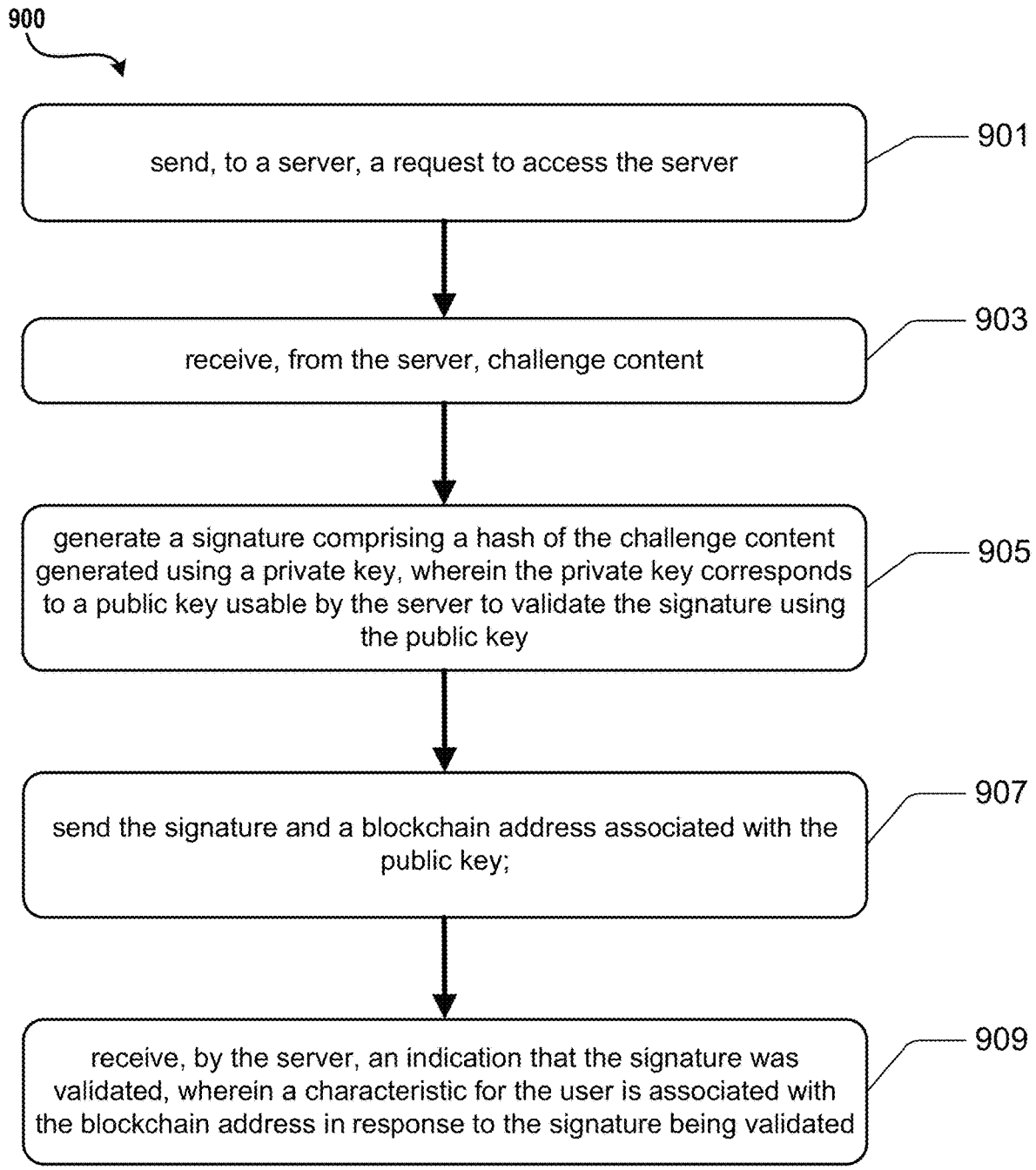
FIG. 9 is a flow diagram showing aspects of an illustrative routine, according to one embodiment disclosed herein.

FIG. 9 is a diagram illustrating aspects of a routine 900 for implementing some of the techniques disclosed herein.

The routine 900 begins at operation 901, which illustrates sending, to a server, a request to access the server.

The routine 900 then proceeds to operation 903, which illustrates receiving, from the server, challenge content.

Operation 905 illustrates generate a signature comprising a hash of the challenge content generated using a private key, wherein the private key corresponds to a public key usable by the server to validate the signature using the public key.

Operation 907 illustrates sending the signature and a blockchain address associated with the public key Operation 909 illustrates receiving, by the server, an indication that the signature was validated, wherein a characteristic for the user is associated with the blockchain address in response to the signature being validated. In an embodiment, the characteristic includes an authorization to bid on an item on an auction site.

Figure 10:
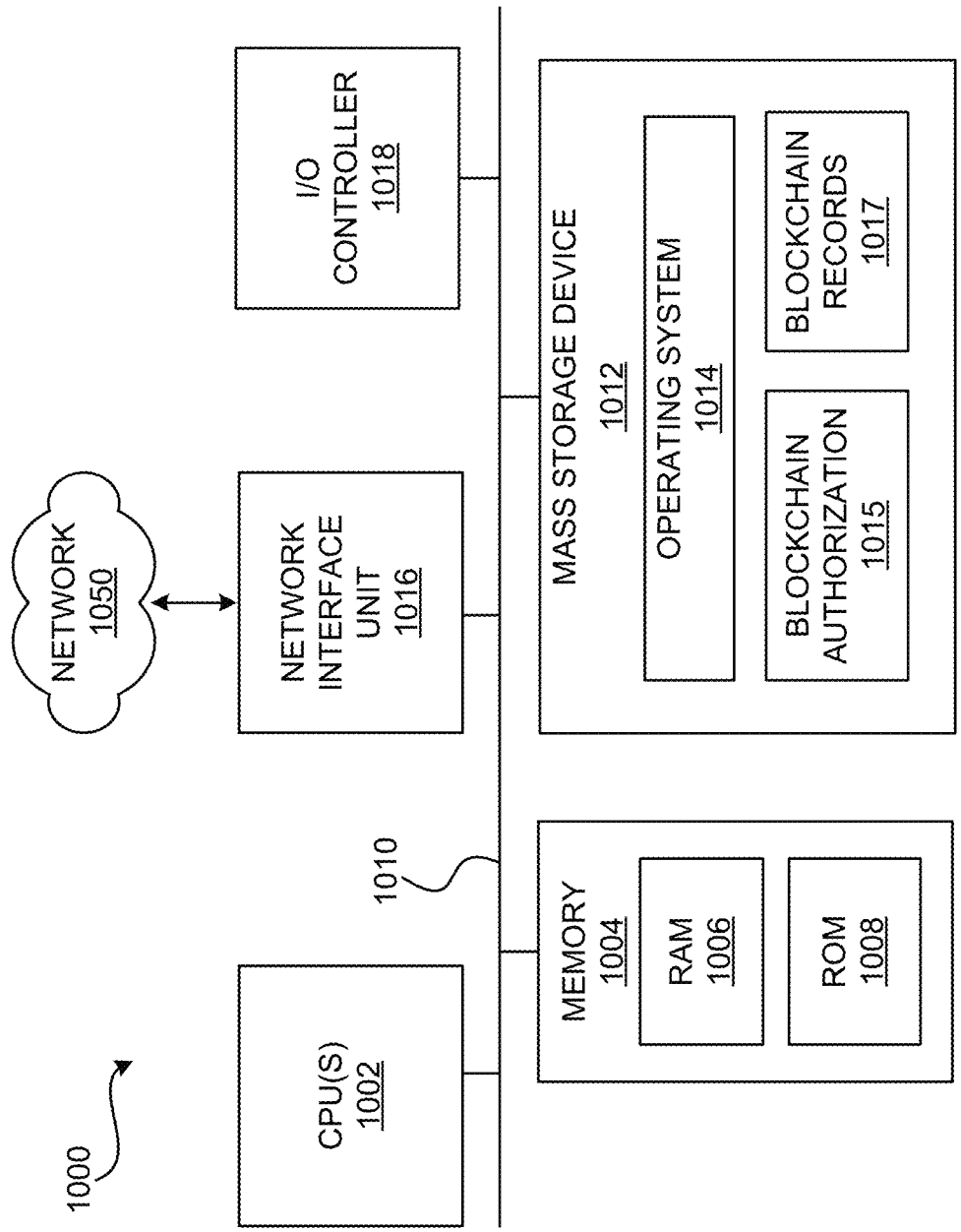
FIG. 10 is a computer architecture diagram illustrating aspects of an example computer architecture for a computer capable of executing the software components described herein.

FIG. 10 shows an example computer architecture for a computer capable of providing the functionality described herein such as, for example, a computing device configured to implement the functionality described above with reference to FIGS. 1-6. Thus, the computer architecture 1000 illustrated in FIG. 10 illustrates an architecture for a server computer or another type of computing device suitable for implementing the functionality described herein. The computer architecture 1000 might be utilized to execute the various software components presented herein to implement the disclosed technologies.

The computer architecture 1000 illustrated in FIG. 10 includes a central processing unit 1002 ("CPU"), a system memory 1004, including a random-access memory 1006 ("RAM") and a read-only memory ("ROM") 1008, and a system bus 1010 that couples the memory 1004 to the CPU 1002. A firmware containing basic routines that help to transfer information between elements within the computer architecture 1000, such as during startup, is stored in the ROM 1008. The computer architecture 1000 further includes a mass storage device 1012 for storing an operating system 1014, other data, and one or more executable programs, such as programs for implementing the blockchain authorization functions 1015 or storing blockchain records 1017.

The mass storage device 1012 is connected to the CPU 1002 through a mass storage controller (not shown) connected to the bus 1010. The mass storage device 1012 and its associated computer-readable media provide non-volatile storage for the computer architecture 1000. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 1000.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 1000. For purposes of the claims, the phrase "computer storage medium," "computer-readable storage medium" and variations thereof, does not include waves, signals, and/or other transitory and/or intangible communication media, per se.

According to various implementations, the computer architecture 1000 might operate in a networked environment using logical connections to remote computers through a network 1050 and/or another network (not shown). A computing device implementing the computer architecture 1000 might connect to the network 1050 through a network interface unit 1016 connected to the bus 1010. It should be appreciated that the network interface unit 1016 might also be utilized to connect to other types of networks and remote computer systems.

The computer architecture 1000 might also include an input/output controller 1018 for receiving and processing input from a number of other devices, including a keyboard, mouse, or electronic stylus (not shown in FIG. 10). Similarly, the input/output controller 1018 might provide output to a display screen, a printer, or other type of output device (also not shown in FIG. 10). It should also be appreciated that via a connection to the network 1050 through a network interface unit 1016, the computing architecture might enable the product of the prefetch engine 108 to be distributed.

It should be appreciated that the software components described herein might, when loaded into the CPU 1002 and executed, transform the CPU 1002 and the overall computer architecture 1000 from a general-purpose computing system into a special-purpose computing system customized to facilitate the functionality presented herein. The CPU 1002 might be constructed from any number of transistors or other discrete circuit elements, which might individually or collectively assume any number of states. More specifically, the CPU 1002 might operate as a finite-state machine, in response to executable instructions contained within the software modules disclosed herein. These computer-executable instructions might transform the CPU 1002 by specifying how the CPU 1002 transitions between states, thereby transforming the transistors or other discrete hardware elements constituting the CPU 1002.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 1000 in order to store and execute the software components presented herein. It also should be appreciated that the computer architecture 1000 might include other types of computing devices, including hand-held computers, embedded computer systems, personal digital assistants, and other types of computing devices known to those skilled in the art.

It is also contemplated that the computer architecture 1000 might not include all of the components shown in FIG. 10, might include other components that are not explicitly shown in FIG. 10, or might utilize an architecture completely different than that shown in FIG. 10. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 11A:
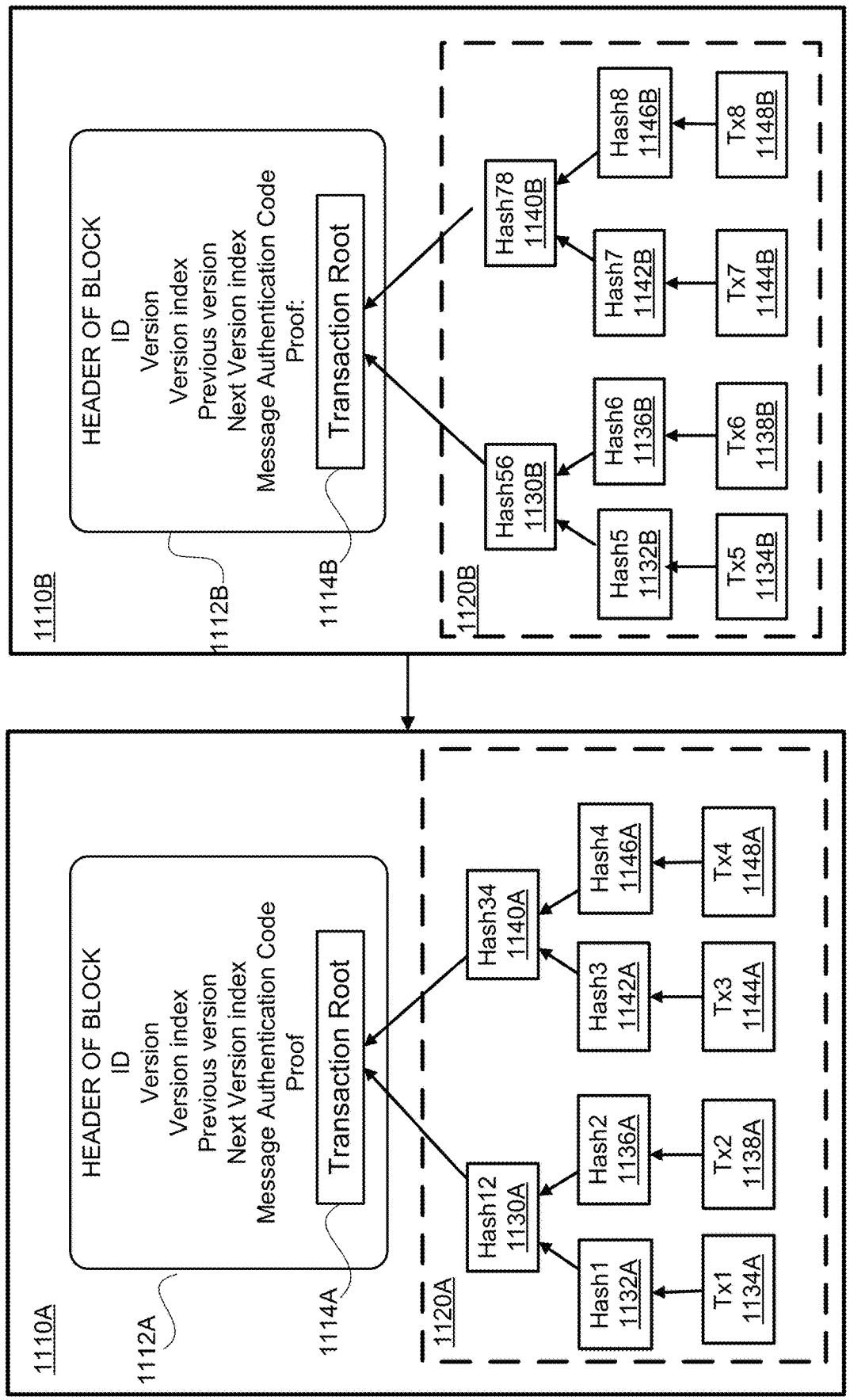
FIG. 11A is a data architecture diagram illustrating a simplified example of a blockchain ledger.

FIG. 11A is a data architecture diagram illustrating a simplified example of a blockchain ledger 1100. The blockchain ledger 1100 example of FIG. 11A is simplified to show block headers, metadata and signatures in order to demonstrate an example ledger using a blockchain. More generally, a blockchain ledger may be a globally shared transactional database.

FIG. 11A is an illustrative example of a blockchain ledger 1100 with a data tree holding transaction information that is verified using cryptographic techniques. In FIG. 11A, each block 1110 includes a block header 1112 with information regarding previous and subsequent blocks and stores a transaction root node 1114 to a data tree 1120 holding transactional data. Shipping information may store smart contracts, data related to transactions, or any other data. The elements of smart contracts may also be stored within transaction nodes of the blocks.

In the example of FIG. 11A, a Merkle tree 1120 is used to cryptographically secure the transaction information. For example, Transaction Tx1 node 1134A of data tree 1120A of block 1110A can be hashed to Hash1 node 1132A, Transaction Tx2 node 1138A may be hashed to Hash2 node 1136A. Hash1 node 1132A and Hash2 node 1136A may be hashed to Hash12 node 1130A. A similar subtree may be formed to generate Hash34 node 1140A. Hash12 node 1130A and Hash34 node 1140A may be hashed to Transaction Root 1114A hash sorted in the data block 1110A. By using a Merkle tree, or any similar data structure, the integrity of the transactions may be checked by verifying the hash is correct.

Figure 11B:
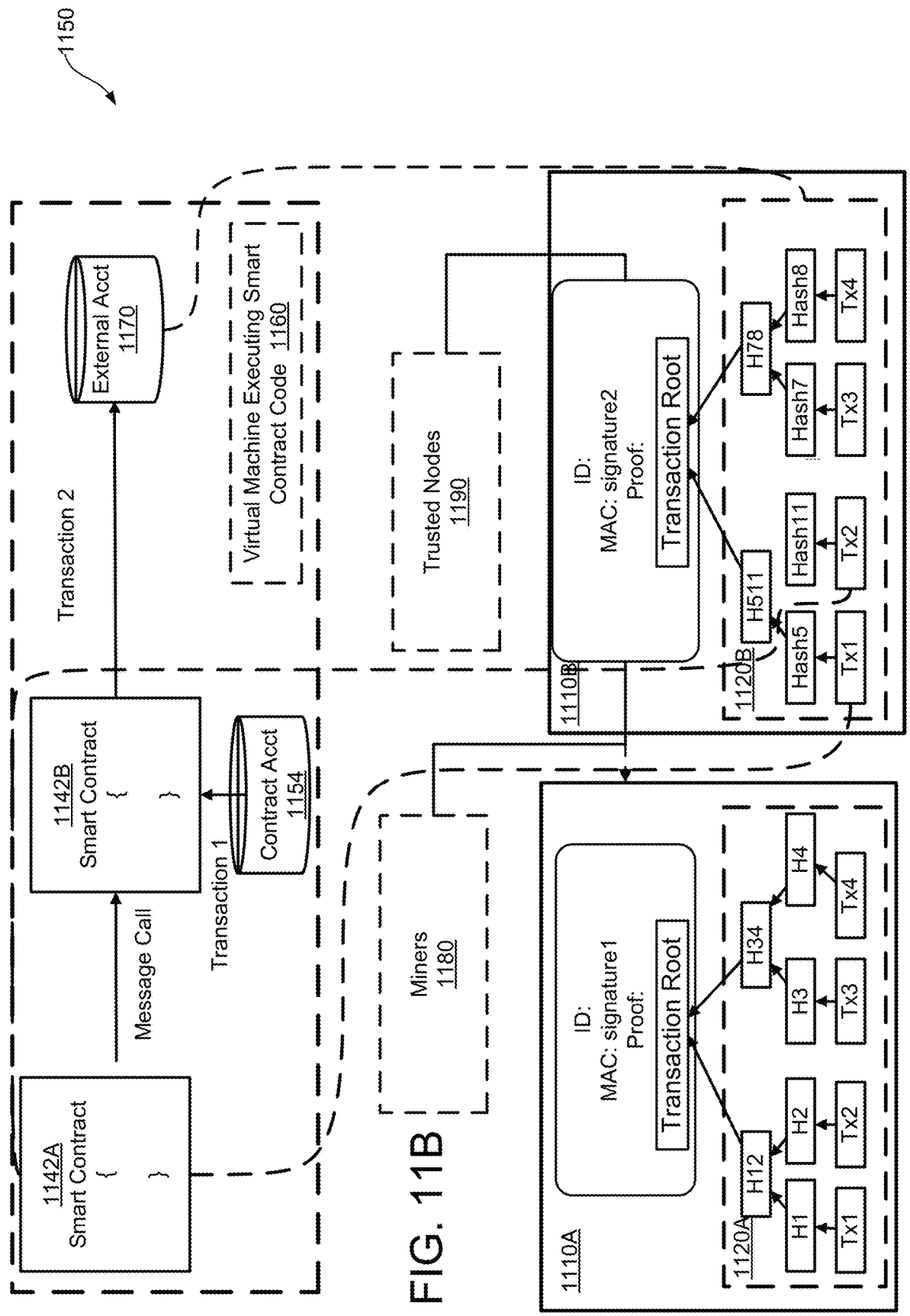
FIG. 11B is a data architecture diagram showing an illustrative example of smart contract code, transactions and messages that are bundled into a block.

FIG. 11B is a data architecture diagram showing an illustrative example of smart contract code, transactions and messages that are bundled into a block so that their integrity is cryptographically secure and so that they may be appended to a blockchain ledger. In FIG. 11B, smart contracts 1142 are code that executes on a computer. More specifically, the code of a smart contract may be stored in a blockchain ledger and executed by nodes of a distributed blockchain platform at a given time. The result of the smart code execution may be stored in a blockchain ledger. Optionally, a currency may be expended as smart contract code is executed. In the example of FIG. 11B, smart contracts 1142 are executed in a virtual machine environment, although this is optional.

In FIG. 11B, the aspects of smart contracts 1142 are stored in transaction information nodes in data tree 1120 in the blocks 1110 of the blockchain ledger of FIG. 11A. In the example of FIG. 11B, Smart Contract 1142A is stored in data block Tx1 node 1134A of data tree 1120A in block 1110A, Smart Contract 1142B is stored in Tx2 node 1138A, Contract Account 1154 associated with Smart Contract 1142B is stored in Tx3 node 1144A, and External Account is stored in Tx4 node 1148A.

To ensure the smart contracts are secure and generate secure data, the blockchain ledger must be kept up to date. For example, if a smart contract is created, the code associated with a smart contract must be stored in a secure way. Similarly, when smart contract code executes and generates transaction information, the transaction information must be stored in a secure way.

In the example of FIG. 11B, at least embodiments for maintenance of the blockchain ledger are shown. In one embodiment, untrusted miner nodes ("miners") 1180 may be rewarded for solving a cryptographic puzzle and thereby be allowed to append a block to the blockchain. Alternatively, a set of trusted nodes 1190 may be used to append the next block to the blockchain ledger. Nodes may execute smart contract code, and then one winning node may append the next block to a blockchain ledger.

Though aspects of the technology disclosed herein resemble a smart contract, in the present techniques, the policy of the contract may determine the way that the blockchain ledger is maintained. For example, the policy may require that the validation or authorization process for blocks on the ledger is determined by a centralized control of a cluster of trusted nodes. In this case, the centralized control may be a trusted node, such as a sender server that is authorized to attest and sign the transaction blocks to validate them and validation by miners may not be needed.

Alternatively, the policy may provide for validation process decided by a decentralized cluster of untrusted nodes. In the situation where the blockchain ledger is distributed to a cluster of untrusted nodes, mining of blocks in the chain may be employed to validate the blockchain ledger.

Blockchains may use various time-stamping schemes, such as proof-of-work, to serialize changes. Alternate consensus methods include proof-of-stake, proof-of-burn, proof-of-research may also be utilized to serialize changes.

As noted above, in some examples, a blockchain ledger may be validated by miners to secure the blockchain. In this case, miners may collectively agree on a validation solution to be utilized. However, if a small network is utilized, e.g. private network, then the solution may be a Merkle tree and mining for the validation solution may not be required. When a transaction block is created, e.g. a transaction information data block for a transaction information data blockchain, the block is an unconfirmed and unidentified entity. To be part of the acknowledged "currency", it may be added to the blockchain, and therefore relates to the concept of a trusted cluster.

In a trusted cluster, when a data block is added, every node competes to acknowledge the next "transaction" (e.g. new transaction information or access control rule block). In one example, the nodes compete to mine and obtain the lowest hash value: min{previous_hash, contents_hash, random_nonce_to_be_guessed}→result. Transaction order is protected by the computational race (faith that no one entity can beat the collective resources of the blockchain network). Mutual authentication parameters are broadcast and acknowledged to prevent double entries in the blockchain.

Alternatively, by broadcasting the metadata for authenticating a secure ledger across a restricted network, e.g. only the signed hash is broadcast, the blockchain may reduce the risks that come with data being held centrally. Decentralized consensus makes blockchains suitable for the recording of secure transactions or events. The metadata, which may contain information related to the data file, may also be ciphered for restricted access so that the metadata does not disclose information pertaining to the data file.

The mining process may be utilized to deter double accounting, overriding or replaying attacks, with the community arrangement on the agreement based on the "good faith" that no single node can control the entire cluster. A working assumption for mining is the existence of equivalent power distribution of honest parties with supremacy over dishonest or compromised ones. Every node or miner in a decentralized system has a copy of the blockchain. No centralized "official" copy exists and no user is "trusted" more than any other. Transactions may be broadcast to the network using software. Mining nodes may compete to compute a validation solution to validate transactions, and then broadcast the completed block validation to other nodes. Each node adds the block to its copy of the blockchain with transaction order established by the winning node.

Note that in a restricted network, stake-holders who are authorized to check or mine for the data file may or may not access the transaction blocks themselves, but would need to have keys to the metadata (since they are members of the restricted network, and are trusted) to obtain the details. As keys are applied on data with different data classifications, the stakeholders can be segmented.

A decentralized blockchain may also use ad-hoc secure message passing and distributed networking. In this example, the transaction information blockchain ledger may be different from a conventional blockchain in that there is a centralized clearing house, e.g. authorized central control for validation. Without the mining process, the trusted cluster can be contained in a centralized blockchain instead of a public or democratic blockchain. One way to view this is that a decentralized portion is as "democratic N honest parties" (multiparty honest party is a cryptography concept), and a centralized portion as a "trusted monarchy for blockchain information correction". For example, there may be advantages to maintaining the data file as centrally authorized and kept offline.

In some examples, access to a resource and access control rule on a blockchain can be restricted by cryptographic means to be only open to authorized servers. Since the transaction information or transaction information blockchain ledgers are distributed, the authorized servers can validate it. A public key may be used as an address on a public blockchain ledger.

Growth of a decentralized blockchain may be accompanied by the risk of node centralization because the computer resources required to operate on bigger data become increasingly expensive.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

One of ordinary skill in the art will recognize that a wide variety of approaches may be utilized and combined with the present approach involving a transaction information blockchain ledger. The specific examples of different aspects of a transaction information blockchain ledger described herein are illustrative and are not intended to limit the scope of the techniques shown.

Smart contracts may be defined by code. As described previously, the terms and conditions of the smart contract may be encoded (e.g., by hash) into a blockchain ledger. Specifically, smart contracts may be compiled into a byte-code (if executed in a virtual machine), and then the byte-code may be stored in a blockchain ledger as described previously. Similarly, shipping information executed and generated by smart contracts may be stored in the blockchain ledger in the ways previously described.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   receiving, by a first computing device, a request from a second computing device to access the first computing device;
   responsive to receiving the request, generating, by the first computing device, challenge content;
   sending, by the first computing device to the second computing device, the generated challenge content;
   receiving, by the first computing device from the second computing device, a signature comprising a hash of the challenge content generated using a private key and a blockchain address associated with the signature;
   accessing, by the first computing device, a public key corresponding to the private key;
   validating, by the first computing device, the signature using the public key; and
   in response to validating the signature, updating an account of a user associated with the blockchain address.

2. The method of claim 1, wherein the challenge content is a string of randomly generated characters.

3. The method of claim 1, wherein the public key is encoded in the blockchain address.

4. The method of claim 1, wherein the blockchain address is associated with a cryptocurrency wallet.

5. The method of claim 1, further comprising authorizing, in response to validating the signature by the first computing device, an account associated with the user to bid on an item on an auction site.

6. The method of claim 1, wherein updating the account comprises linking the user with a global unique identifier (GUID).

7. The method of claim 1, wherein updating the account comprises allowing the user to access one or more websites or one or more functions.

8. The method of claim 6, further comprising linking a reputation or status of the user on a website or online marketplace to the GUID.

9. The method of claim 8, wherein reputation or status of the user is determined using a past purchase history, sales history, or payment history of the user that is recorded on a blockchain associated with the blockchain address.

10. The method of claim 1, wherein the updating of the account of the user associated with the blockchain address is based on a value of funds stored at the blockchain address associated with the user that exceeds a threshold value, the blockchain address associated with a cryptocurrency wallet associated with the user.

11. A computing system, comprising:
    one or more processors; and
    a non-transitory computer-readable storage medium having computer-executable instructions stored thereupon which, when executed by the one or more processors, cause the one or more processors to:
    receive a request to access one or more services;
    in response to the request, generate challenge content;
    send the generated challenge content;
    receive a signature comprising a hash of the challenge content generated using a private key, and a blockchain address associated with the private key;

access a public key corresponding to the private key;
validate the signature using the public key; and
in response to validating the signature, updating an account associated with the blockchain address with an owner of the blockchain address.

12. The computing system of claim 11, wherein updating the account comprises determining a reputation for the owner based on past transactions for the owner.

13. The computing system of claim 12, wherein the reputation is a reputational score or rating that is based on past purchase history, sales history, and payment history for the owner.

14. The computing system of claim 13, further comprising computer-executable instructions stored thereupon which, when executed by the one or more processors, cause the one or more processors to associate the owner with an indication that the reputational score exceeds a threshold level.

15. The computing system of claim 11, wherein the account is determined based on information encoded in a blockchain associated with the blockchain address.

16. The computing system of claim 15, wherein the information comprises one or more of buying habits, browser fingerprints, Internet protocol (IP) addresses of devices used by the owner, a username, an email address, a phone number, or a physical address.

17. The computing system of claim 15, wherein the information is stored in a private blockchain that is not publicly available.

18. The computing system of claim 11, wherein the account associated with the owner is encoded in a blockchain associated with the owner.

19. A non-transitory computer-readable storage medium having computer-executable instructions stored thereupon which, when executed by a processor of a computing device, cause the computing device to:

send, to a server, a request to access the server;

receive, from the server, challenge content generated responsive to receiving the request to access the server;

generate a signature comprising a hash of the challenge content, the challenge content generated by using a private key, wherein the private key corresponds to a public key usable by the server to validate the signature using the public key;

send, to the server, the signature and a blockchain address associated with the public key; and receive, from the server, an indication that the signature was validated, wherein an account for a user is associated with the blockchain address in response to the signature being validated.

20. The non-transitory computer-readable storage medium of claim 19, wherein the account includes an authorization to bid on an item on auction site.

* * * * *